(12) United States Patent
Bala et al.

(10) Patent No.: US 10,878,039 B2
(45) Date of Patent: Dec. 29, 2020

(54) CREATING KNOWLEDGE BASE OF SIMILAR SYSTEMS FROM PLURALITY OF SYSTEMS

(71) Applicant: International Business Machines Corporation, Armonk, NY (US)

(72) Inventors: Vasanth Bala, Rye, NY (US); Hao Chen, Allston, MA (US); Sastry S. Duri, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 14/492,666

(22) Filed: Sep. 22, 2014

(65) Prior Publication Data
US 2016/0088120 A1 Mar. 24, 2016

(51) Int. Cl.
*G06F 16/9035* (2019.01)
(52) U.S. Cl.
CPC ................................. *G06F 16/9035* (2019.01)
(58) Field of Classification Search
CPC .................................................... G06F 16/9035
See application file for complete search history.

(56) References Cited

U.S. PATENT DOCUMENTS

| | | | |
|---|---|---|---|
| 6,460,045 B1 * | 10/2002 | Aboulnaga | G06F 17/30469 |
| 8,478,761 B2 | 7/2013 | Moraleda | |
| 8,489,583 B2 | 7/2013 | Phillips et al. | |
| 2006/0247944 A1 * | 11/2006 | Calusinski, Jr. | G06Q 40/00 705/1.1 |
| 2009/0254540 A1 * | 10/2009 | Musgrove | G06F 16/38 |
| 2011/0307501 A1 * | 12/2011 | Terwilliger | G06F 17/30297 707/756 |
| 2012/0102033 A1 * | 4/2012 | Sarshar | G06F 17/30784 707/737 |

\* cited by examiner

*Primary Examiner* — James Trujillo
*Assistant Examiner* — Kurt A Mueller
(74) *Attorney, Agent, or Firm* — Kenneth Han

(57) ABSTRACT

Methods according to the present disclosure include: creating a representative profile from at least one change profile with an identifying tag from a repository, the representative profile including fewer than all possible changes to a system from an event; creating a candidate profile for a first candidate system, not flagged as similar or dissimilar, from the plurality of systems, wherein the candidate profile includes fewer than all changes to the first candidate system from the event; calculating at least one difference between the representative profile and the candidate profile; where the at least one difference is not within at least one threshold, flagging the first candidate system as dissimilar; and where the at least one difference is within the at least one threshold, flagging the first candidate system as similar, associating the identifying tag with the candidate profile, and adding the candidate profile to the repository.

20 Claims, 6 Drawing Sheets

CREATING KNOWLEDGE BASE OF SIMILAR SYSTEMS FROM PLURALITY OF SYSTEMS

BACKGROUND

The present disclosure relates generally to creating a knowledge base of similar systems from a plurality of systems, such as a group of systems in a cloud computing environment. More specifically, the present disclosure relates to methods and systems which can build a knowledge base by reference to a representative group of changing system attributes, and without relying upon user-constructed rules.

A single data center cloud can simultaneously host thousands of virtual machine (VM) instances. A "virtual machine" can refer to, e.g., hardware or software for locally or remotely emulating a particular computer system by use of software within another computer system. These VM instances may be changed or updated after only moments of operation. Sometimes, two VM instances booted from single image can be changed so differently that a software update to one VM instance can complete successfully, but may fail on the second VM instance. Determining the difference between two or more VM instances in a situation such as this represents a significant technical concern for information technology (IT) managers.

In a conventional approach, a user and/or technician can write custom scripts to find, among other things, the changes made to a particular system after it is booted. These custom scripts can then execute on other systems. Possible events underlying these system changes can include innumerable situations, including software installation, updates, system reconfiguration, process execution, etc. Of these examples, software installation is a frequent and significant source of changes to a system. Rules provided in custom scripts can check for the existence of certain files, and examine the attributes of discovered files.

In an example, where a rule encounters a file named, e.g., SIGFILESDKXA64 500500: SY S2 and its size is 100 KB, a set of user-defined rules can determine that the file corresponds to a product called XYZ SDK 5.0 for Linux AMD/EMT 64. Other rules, e.g., rules for determining whether a given software fix is applicable to a given system, can be more complex and may involve over a dozen separate conditions to be checked. Depending on intended use, rules can identify a specific software application and its major version (e.g., Java 5) or may be adapted to identify all releases of the application, including both permanent and temporary fixes.

In some cases, even a carefully constructed rule can fail. Suppose, for example, a program XYZ SDK 5.0 ("XYZ Java") for Linux AMD/EMT 64 is installed. This version of XYZ Java may be subject to a vulnerability alert, which can be rectified by installing a particular fix. Installing the fix may not change the file information SIGFILESDKXA64 500500:SY S2 in any manner. As a result, the first example rule described above will not distinguish between a vulnerable version and a fixed version of the XYZ Java on a particular system.

Rule-based systems thus require up-to-date rules to comport with minor and major software changes. Typical rules, which may be designed only once, may take into account only a small subset of the files of a given software component. Any changes to the software component would therefore need to also change the files used in the defined rules. Further, every time a fix pack is released for a particular program, it may be necessary for a new rule to be released or designed as well. If new and updated rules are not provided for each update, the usefulness of existing rules may decrease. This approach may not be practical or even possible because different individuals or entities are often responsible for developing program fixes and writing the various discovery rules. In addition, the rule-based discovery approach may not be accessible to many users. A user must then learn a new rule language and be familiar with specific software components to write good discovery rules. A rule-based discovery approach is also generally unable to detect unknown system changes. Thus, the attributes of a system change must be studied before designing rules to discover similar system changes. This process typically involves significant labor and time, and may be fruitless in the case where software is released multiple times a week, and systems in a cloud computing environment are changed frequently (e.g., nearly every minute).

Despite these concerns, system changes and updates may need to be tracked routinely to manage a particular group of systems. With over thousands of systems in a cloud environment or other setting running at any given time, a quarter million features per system on average, and frequent snapshots of the system being needed, the amount of space needed to keep track of all possible changes is tremendous and continues to increase.

SUMMARY

A first aspect of the present disclosure provides a method of creating a knowledge base of similar systems from a plurality of systems, the method comprising using a computing device to perform actions including: creating a representative profile from at least one change profile from a repository of change profiles, the at least one change profile being associated with an identifying tag, wherein the representative profile includes fewer than all possible changes to a system from an event; creating a candidate profile for a first candidate system from the plurality of systems, the first candidate system not being flagged as similar or dissimilar, wherein the candidate profile includes fewer than all changes to the first candidate system from the event; calculating at least one difference between the representative profile and the candidate profile; in response to the at least one difference not being within at least one threshold, flagging the first candidate system as being dissimilar; and in response to each of the at least one difference being within the at least one threshold, flagging the first candidate system as being similar, associating the identifying tag with the candidate profile, and adding the candidate profile to the repository as a new change profile.

A second aspect of the present disclosure provides a program product stored on a computer readable storage medium, the program product operative to create a knowledge base of similar systems from a plurality of systems when executed, the computer readable storage medium comprising program code for: creating an additional candidate profile for a second candidate system from the plurality of systems, the second candidate system not being flagged as similar or dissimilar, wherein the additional candidate profile includes fewer than all changes to the second candidate system from the event; calculating at least one second difference between the representative profile and the additional candidate profile; in response to the at least one second difference exceeding at least one additional threshold, flagging the second candidate system as being dissimilar, wherein the at least one additional threshold is different from the at least one threshold; and in response to each of the at least one second difference not exceeding the at least one additional threshold, flagging the second candidate system as being similar, associating the identifying tag with the additional candidate profile, and adding the additional candidate profile to the repository as a new change profile.

A third aspect of the present disclosure provides a system for creating a knowledge base of similar systems from a plurality of systems, the system comprising: a profile extractor for creating a representative profile from at least one change profile from a repository of change profiles, the at least one change profile being associated with an identifying tag, wherein the representative profile includes fewer than all possible changes to a system from an event; creating a candidate profile for a first candidate system from the plurality of systems, the first candidate system not being flagged as similar or dissimilar, wherein the candidate profile includes fewer than all changes to the first candidate system from the event; calculating at least one difference between the representative profile and the candidate profile; in response to the at least one difference not being within at least one threshold, flagging the first candidate system as being dissimilar; and in response to each of the at least one difference being within the at least one threshold, flagging the first candidate system as being similar, associating the identifying tag with the additional candidate profile, associating the identifying tag with the candidate profile, and adding the candidate profile to the repository as a new change profile.

BRIEF DESCRIPTION OF THE SEVERAL VIEWS OF THE DRAWINGS

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
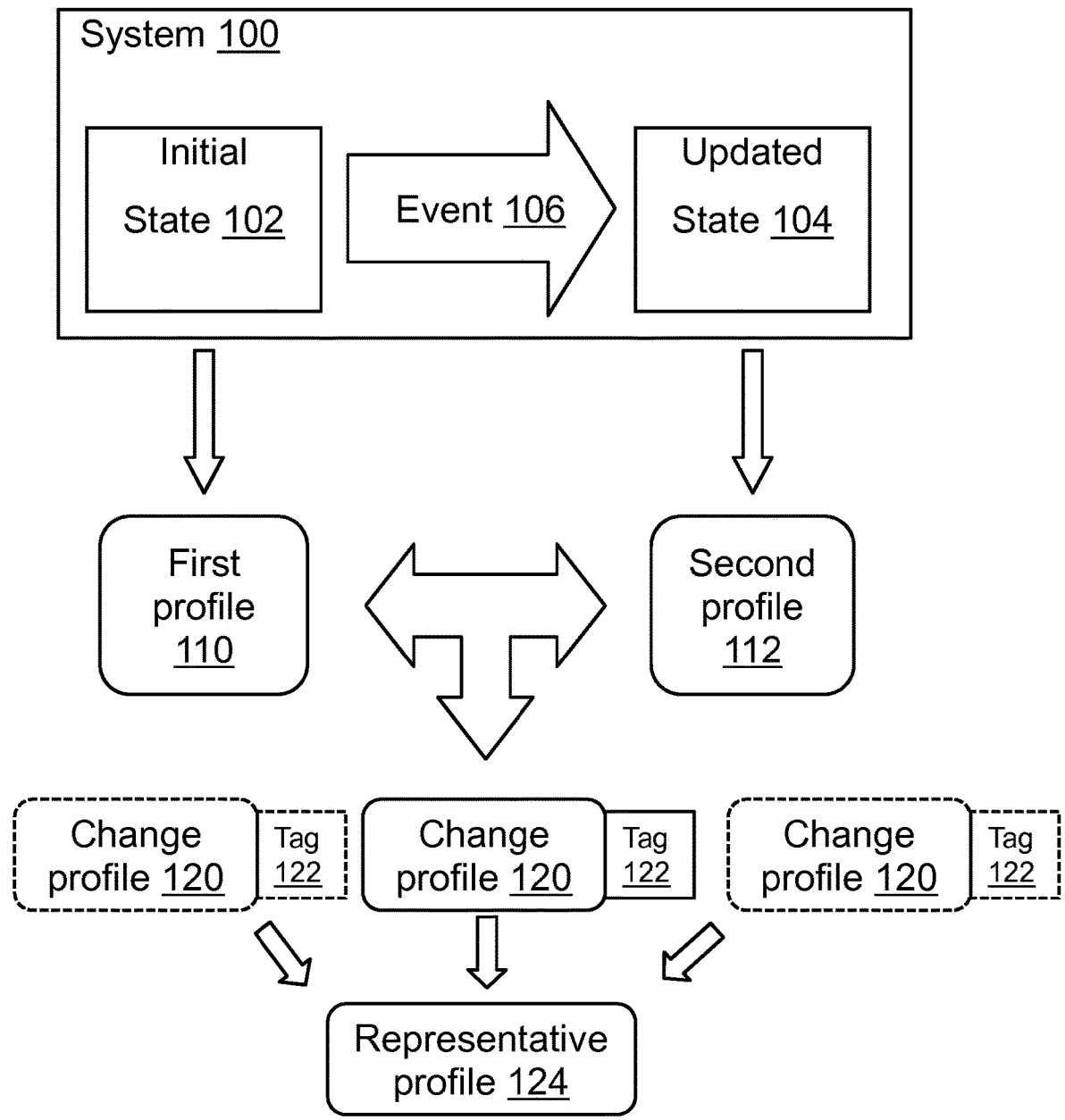
FIG. 1 depicts a process for creating a change profile for a system affected by an event.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

INTRODUCTION AND DEFINITIONS

Embodiments of the present invention are directed toward techniques for building a knowledge base of similar systems from a plurality of systems. Embodiments of the present disclosure allow system changes to be discovered without requiring a user to manually write rules for discovering individual systems, types of changes, and/or software components in data centers with several systems therein. Embodiments of the disclosure can provide adaptive learning, namely, automatically identifying certain features from system changes over time via an identified group of similar systems, and expanding upon the identified group of similar systems with consecutive executions of the process steps described herein. Systems within the group of similar systems can be represented via profiles including only a subset of features from each system. These profiles can be stored in a single repository. These profiles can be used as a basis for constructing a representative profile, which in turn can be a reference for determining whether other systems are similar to those represented in the repository.

To identify similar systems, all changes to a particular system resulting from an event are logged and stored as data. These changes can then be extracted to create a "change profile." The "change profile" can be an abbreviated description of the system's attributes, and can include fewer than all changes to the system from an event. In an embodiment, the change profile can include only those features which may be relevant for discovery, such as file base-names. A representative profile corresponding to a group of systems affected by the same event can be constructed from the various change profiles. The present disclosure discusses three types of representative profiles by way of example. However, the embodiments disclosed herein may be modified to create other types of representative profiles. The example representative profiles discussed herein include a file base-name representation, a histogram representation, and a pixel-level image representation.

Although embodiments of the disclosure are discussed by example as being applicable to state changes caused by software updates and/or installations, embodiments of the present disclosure can be applied to events such as arbitrary system changes, changes to system configuration, and changes stemming from processes which are currently operating. Applying embodiments of the present disclosure to arbitrary system changes is applicable to detecting drift in systems, e.g., by periodically scanning a group of systems and extracting their change profiles. Advantages to the methods and systems discussed herein include distortion resistance and defense against noise created from a system change. Embodiments of the present disclosure can also increase speed, storage efficiency, and scalability. The present disclosure also allows unknown or arbitrary system changes to be detected. In addition, embodiments of the present disclosure incorporate self-learning by automatically creating new representative profiles after new similar systems are discovered, reducing the need for a to have advance knowledge of specialties or manual updates.

Creation of Change Profiles

Turning to FIG. 1, a process for creating a "change profile" for a system 100 is shown. As used herein, the term "system" can refer to a computer system, server, etc. composed wholly or partially of hardware and/or software components, one or more instances of a system embodied in software and accessible a local or remote user, all or part of one or more systems in a cloud computing environment, one or more physical and/or virtual machines accessed via the internet, other types of physical or virtual computing devices, and/or components thereof. The term "change profile" refers to an item of data which embodies the difference between two "profiles" of the same system at two points in time, preceding and following a particular event, and including fewer than all attributes of the corresponding system. A "profile" refers to any representation of a system which includes fewer than all attributes for the system at a particular time or fewer than all attributes which may be changed in a particular event. The attributes represented in the change profile can include but are not limited to, e.g., a system configuration, a system connection, a disk, a file, a file size, one or more file names (e.g., file base-names), a listing of open files, a software package, one or more listings of hardware components, a process (whether running or not running) housed and/or embodied within the system, and/or any set of properties associated with entities that are present in the system.

As shown in FIG. 1, system 100 in an initial state 102 may transfer to an updated state 104 with different attributes following an event 106 (e.g., a software installation and/or update). Before event 106 (e.g., installation) occurs, hardware and/or software components according to the present disclosure can build a first profile 110 from system 100 in initial state 102, corresponding to a time before event 106 occurs. Event 106 thereafter causes system 100 to reach updated state 104. A system and/or software component according to the present disclosure can build a second profile 112 from updated state 104. A change profile 120 can be computed for system 100 based on the differences between first profile 110 and second profile 112. Change profile 120 can summarize differences between initial state 102 and updated state 104 of system 100. Each change profile 120 can be associated with an identifying tag 122 ("tag"). Each tag 122 associated with a particular change profile 120 can differentiate particular change profiles 120 from other change profiles 120 by, e.g., identifying a particular event 106 for change profile 120.

Embodiments of the present disclosure can extract a subset of attributes corresponding to initial state 102 and updated state 104 to create change profile 120 for system 100. This approach can offer the advantage of, e.g., including only relevant information concerning system 100, which can be used to quickly identify whether other systems are similar to the characteristics of system 100. Many different types of change profiles 120 are contemplated in embodiments of the present disclosure, and thus the subset of information included in change profile 120 may vary depending on a particular implementation.

Change profile 120 can be in the form of any currently known or later developed format, such as a matrix, table, text file, etc., for providing an analytical summary of feature differences between two profiles of a system. In an illustrative example, change profile 120 can be organized according to the following rules: file features present in second profile 112 but missing from first profile 110 can be grouped together and/or identified as "additions." File features present in first and second profiles 110, 112, but with different file attributes, can be grouped together and/or identified as "modifications." File features present in first and second profiles 110, 112 and with matching attributes can be grouped together and/or identified as "common." File features absent from second profile 112 but present in first profile 110 can be grouped together and marked as "deletions." Embodiments of the present disclosure can optionally use software utilities which automatically resolve dependencies for installing software. In this instance, change profile 120 can include file features from sources connected to a particular system, e.g., server files, files modified during installation, temporary files created during installation, files belonging to software installed to satisfy dependency requirements, repository file updates, files created and modified by other unrelated activities, etc. As discussed herein, a group of change profiles for systems sharing the same tag 122 (e.g., affected by the same event 106) can be represented in the form of a representative profile 124. Representative profile may include attributes shown in at least one of several change profiles 120 with a particular tag 122. More specifically, representative profile 124 can include fewer than all possible changes to a particular system 100 from event 106. Thus, representative profile 124 may or may not correspond to all of the features in a single change profile 120.

Computer System and Example Components

Figure 2:
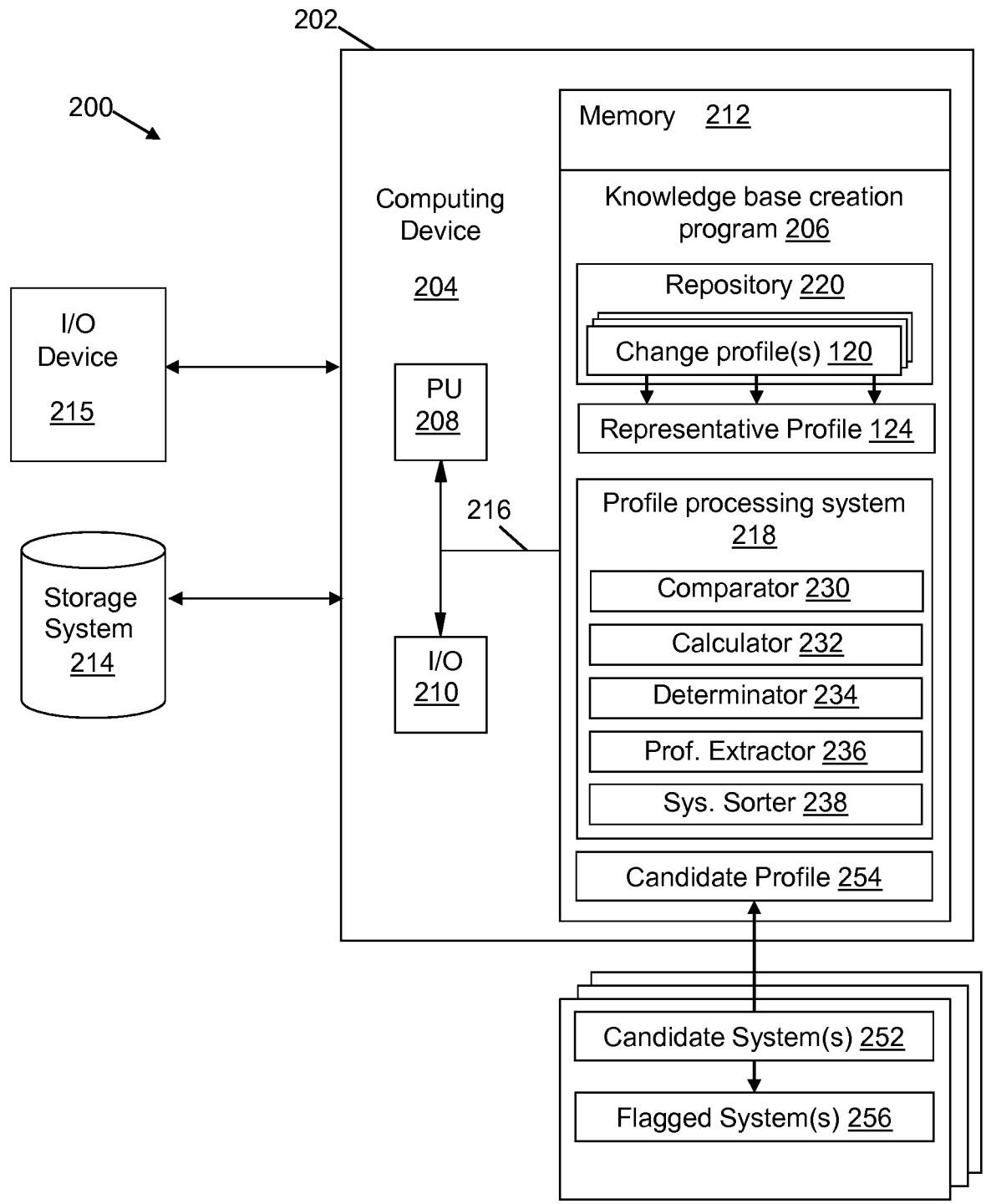
FIG. 2 depicts an illustrative environment which includes a computer system interacting with a plurality of systems according to embodiments of the present disclosure.

Turning now to FIG. 2, an illustrative environment 200 for implementing the methods and/or systems described herein is shown. In particular, a computer system 202 is shown as including a computing device 204. Computing device 204 can include a knowledge base creation program 206 which creates change profiles and identifies similar systems by performing any/all of the processes described herein and implementing any/all of the embodiments described herein.

Computer system 202 is shown including a processing unit 208 (e.g., one or more processors), an I/O component 210, a memory 212 (e.g., a storage hierarchy), an external storage system 214, an input/output (I/O) device 215 (e.g., one or more I/O interfaces and/or devices), and a communications pathway 216. In general, processing unit 208 can execute program code, such as knowledge base creation program 206, which is at least partially fixed in memory 212. While executing program code, processing unit 208 can process data, which can result in reading and/or writing transformed data from/to memory 212 and/or I/O device 215 for further processing. Pathway 216 provides a communications link between each of the components in environment 200. I/O component 210 can comprise one or more human I/O devices, which enable a human user to interact with computer system 202 and/or one or more communications devices to enable a system user to communicate with the computer system 202 using any type of communications link. To this extent, knowledge base creation program 206 can manage a set of interfaces (e.g., graphical user interface(s), application program interface(s), etc.) that enable system users to interact with knowledge base creation program 206. Further, knowledge base creation program 206 can manage (e.g., store, retrieve, create, manipulate, organize, present, etc.) data, through several modules contained within a profile processing system 218.

Further, knowledge base creation program 206 can include a profile processing system 218. In this case, various modules of profile processing system 218 can enable computer system 202 to perform a set of tasks used by knowledge base creation program 206, and can be separately developed and/or implemented apart from other portions of knowledge base creation program 206. Knowledge base creation program can also include repository 220, with one or more change profiles 120 stored therein. Each change profile 120 in repository 220 can record attributes of systems which have been flagged as similar to at least one other system represented by change profile 120 in repository 220.

Further, each change profile 120 in repository 220 may be associated with one or more tags 122 (FIG. 1) for, e.g., identifying a particular event 106 (FIG. 1). Attributes from several change profiles 120 sharing the same tag 122 can be grouped together and expressed as representative profile 124. Process steps for associating a particular tag 122 with new change profiles 120 and adding these new change profiles 120 to repository 220 are discussed in detail elsewhere herein.

Memory 212 can include various software modules configured to perform different actions, including a comparator 230, a calculator 232, a determinator 234, a profile extractor (prof. extractor) 236, and/or a system sorter (sys. sorter) 238. One or more of comparator 230, calculator 232, determinator 234, profile extractor 236, and/or system sorter 238 can use algorithm-based calculations, look up tables, software code, and/or similar tools stored in memory 212 for processing, analyzing, and operating on data to perform their respective functions. Each module discussed herein can obtain and/or operate on data from exterior components, units, systems, etc., or from memory 212 of computing device 204. Profile processing system 218 of knowledge base creation program 206 can assist in building a knowledge base of similar systems from a plurality of systems 250 according to embodiments discussed herein. Plurality of systems 250 may represent a group of systems within a larger environment (e.g., a cloud computing environment or a group of cloud computing environments). One or more candidate systems 252 can be selected from plurality of systems 250. As used herein, the term "candidate system" can refer to any system, as defined elsewhere herein, from plurality of systems 250 which has not previously been flagged as similar or dissimilar to representative profile 124 for a particular event 106 (FIG. 1). In addition, candidate system 252 may have undergone one or more events 106 or may otherwise be subject to the effects of particular events 106. Some attributes of candidate system 252 can be converted into a candidate profile 254 and stored electronically, e.g., within memory 212 of computing device 204, storage system 214, and/or any other type of data cache in communication with computing device 204. Candidate profile 254 can be in the same format as some or all of change profiles 120 and/or representative profile 124, and can be created according to the same manner as is shown for change profile 120 in FIG. 1. The only difference between candidate profile 254 and change profiles 120 may be that candidate profile 254 is created from a system from plurality of systems 250 that has not previously been flagged as similar or dissimilar. Plurality of systems 250 may include flagged systems 256, which have already been identified as either similar or dissimilar to representative profile 124 for a particular event 106, either via embodiments of the present disclosure or other, independent process steps. As used herein, a "flagged" system refers to a system in plurality of systems 250 from which candidate profile 254 was created and compared to representative profile 124, and either found to be similar or dissimilar to change profiles 120 in repository 220. Candidate profile 254 can additionally or alternatively be converted into data inputs or other inputs to knowledge base creation program 206 with various scanning or extracting devices and/or manual entry of a user.

Where computer system 202 comprises multiple computing devices, each computing device may have only a portion of knowledge base creation program 206 and/or profile processing system 218 fixed thereon (e.g., one or more modules). However, it is understood that computer system 202 and knowledge base creation program 206 are only representative of various possible equivalent computer systems that may perform a process described herein. Computer system 202 can obtain or provide data, such as data stored in memory 212 or storage system 214, using any solution. For example, computer system 202 can generate and/or be used to generate data from one or more data stores, receive data from another system, send data to another system, etc.

Operational Schematic

Figure 3:
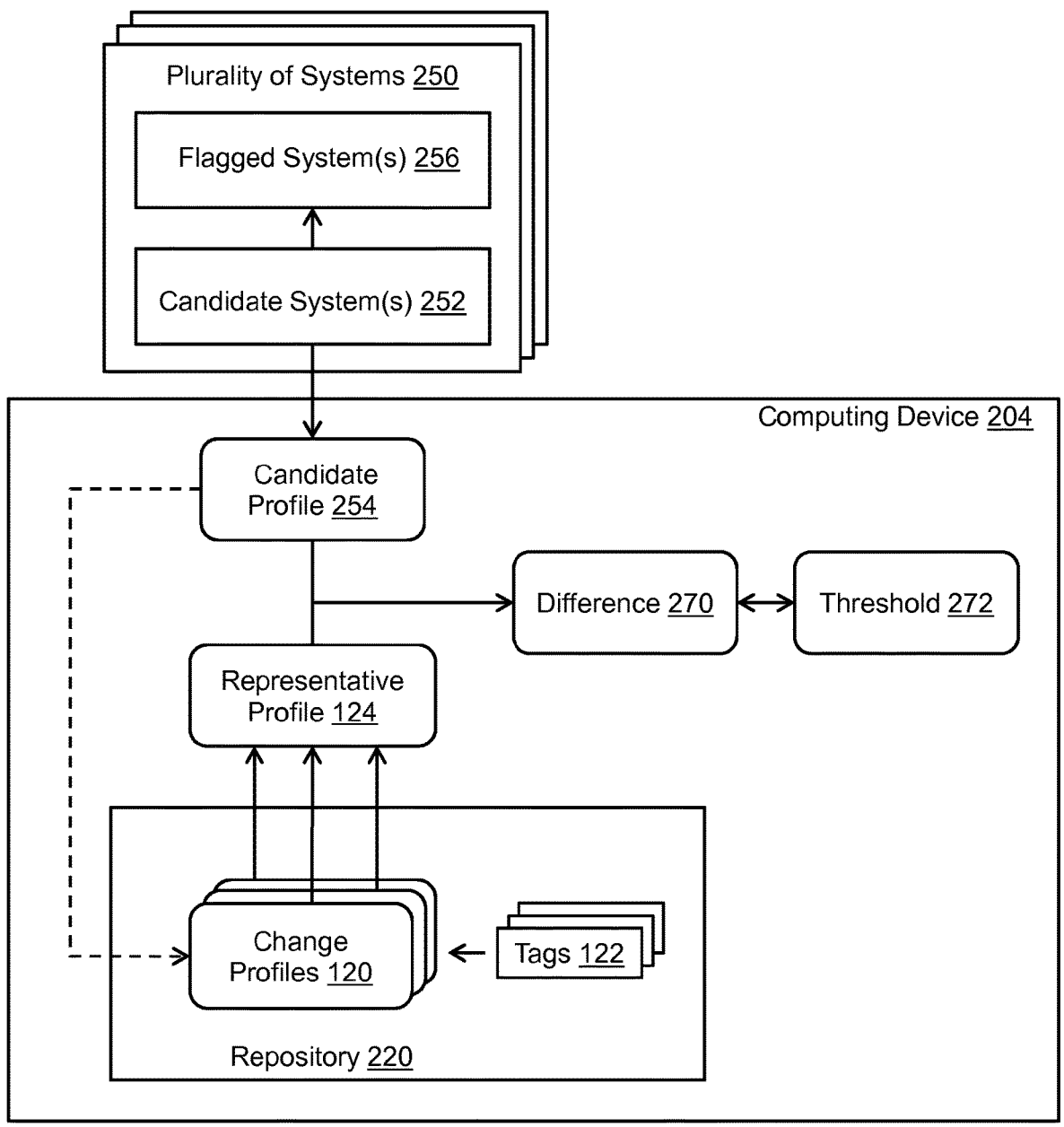
FIG. 3 depicts a schematic diagram of a computing device evaluating a difference between a candidate profile and a representative profile according to embodiments of the present disclosure.

Turning to FIG. 3, a block diagram schematically illustrates computing device 204 evaluating a difference between candidate profile 254 and representative profile 124 according to embodiments of the present disclosure. As is discussed elsewhere herein, profile extractor 236 (FIG. 2) of computing device 204 can create candidate profile 254 for candidate system 252 which has not been flagged as similar or dissimilar to any systems in repository 220 affected by the same event 106 (FIG. 1), associated with a particular tag 122, and represented with representative profile 124. Candidate system 252 may correspond to one or more systems selected from a particular plurality of systems 250, and may be subject to event 106. Plurality of systems 250 can include at least one system potentially affected by an event and/or other types of changes. Candidate profile 254 being in the same format and/or including the same attributes as representative profile 124 can allow calculator 232 to calculate a difference 270 between candidate profile 254 and representative profile 124. As used herein, the term "difference" refers to any representative quantity, metric and/or set of descriptive data for showing attributes and/or values of attributes which differ between representative profile 124 and candidate profile 254.

Several similar change profiles 120 with associated tags 120 can be stored in repository 220. Repository 220 can be stored in memory 212 of computing device 204, or may be embodied as one or more physical computers and/or databases operating at a remote location from other hardware and/or software components described herein. Repository 220 can include, e.g., change profiles 120 corresponding to a particular event 106 (e.g., a software installation) and/or associated with the same tag 122. In addition or alternatively, memory 212 can include several repositories 220 for different "families" of systems, with each family including change profiles 120 corresponding to a particular event 106 (FIG. 1) and/or sharing the same tag 122. Furthermore, each family can correspond to a particular representative profile 124.

Calculator 232 can calculate difference 270 according to the process steps discussed by example herein, and/or any other formulas, processes, algorithms, etc. for calculating the difference between two items of data. For example, calculator 232 can calculate a change in file size between representative profile 124 and candidate profile 254 as difference 270. Difference 270 can represent each difference in attributes between representative profile 124 and candidate profile 254. Comparator 230 can compare difference 270 with threshold 272, which may be a predetermined range of values and/or conditions for difference 270. Determinator 234 can determine, based on this comparison, whether difference 270 is within threshold 272 and/or satisfies the conditions for threshold 272. Where difference 270 is within threshold 272 and/or satisfies the conditions set out therein, candidate profile 254 can be added to repository 220 as another change profile 120 (i.e., along the corresponding phantom line). System sorter 238 can associate the flag 122 for the change profiles used to build representative profile 124 with candidate profile 254, to group candidate profile 254 with change profiles 120 regardless of whether candidate profile 254 was/can be subject to the same event 106. In addition, system sorter 238 can flag candidate system 252 as being similar to the systems represented in repository 220 as change profiles 120, and therefore affected by event 106 (FIG. 1). Where difference 270 is not within threshold 272 and/or fails to satisfy the conditions set out therein, candidate profile 254 is not added to repository 220 and is flagged as being dissimilar to the systems represented by change profiles 120. In either case, candidate system 252 becomes one of flagged systems 256 in plurality of systems 250.

Operational Methodology

Figure 4:
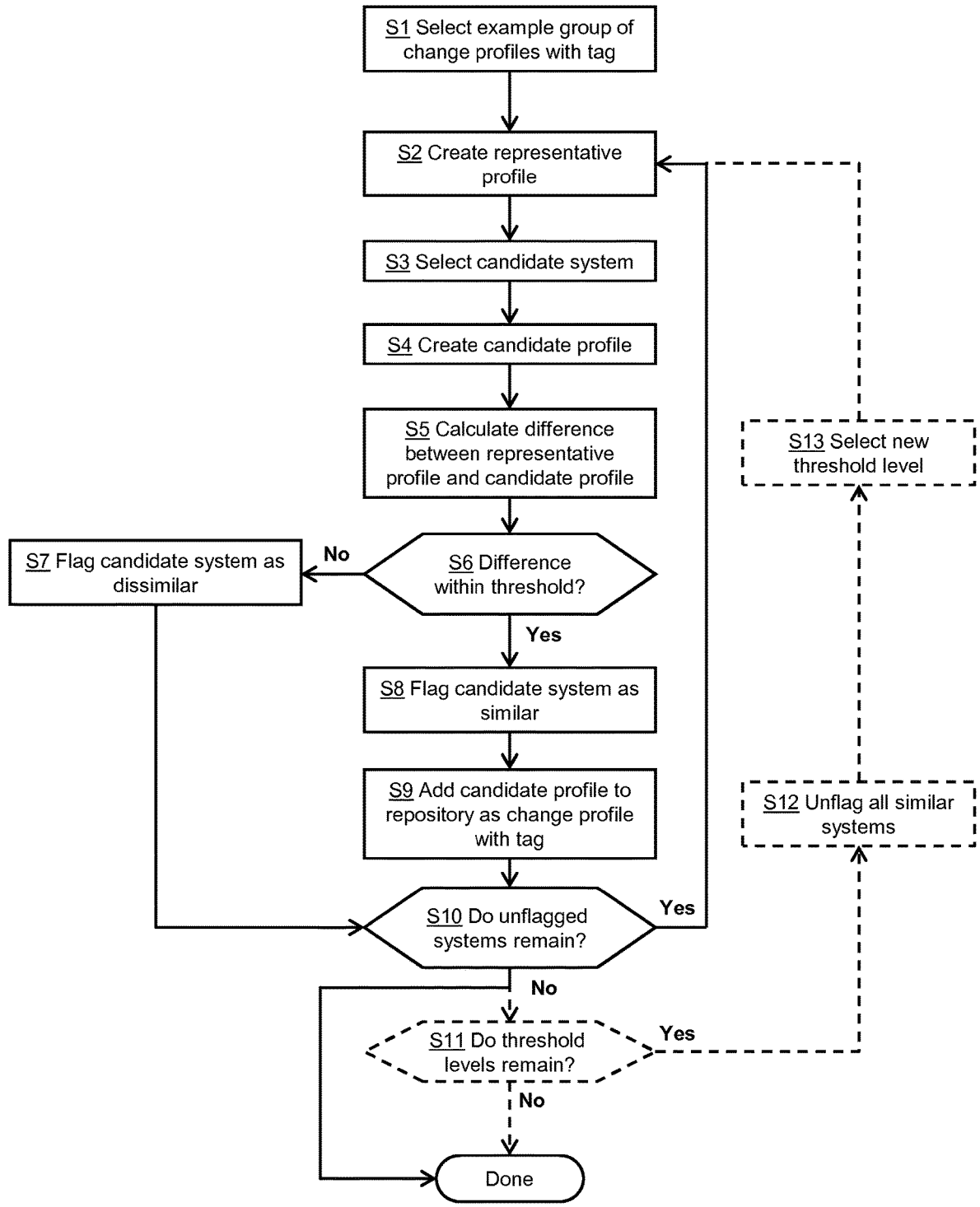
FIG. 4 depicts a flow diagram with illustrative method steps according to embodiments of the present disclosure.

Referring to FIG. 4 in conjunction with FIG. 2, a flow diagram of processes according to the present disclosure is shown. The process flow diagram of FIG. 4 provides an overview of various method steps and processes. The steps and processes can each be carried out with the modules shown in FIG. 2 and described herein by example. Embodiments of the present disclosure, as illustrated by example in FIG. 4, can build a knowledge base of systems from plurality of systems 250 which share particular attributes or features, or otherwise may be similarly affected by particular events. Using the process steps discussed herein, systems can be discovered based on their similarity to a particular system and used as further examples for identifying other, similar systems from plurality of systems 250. In the example method steps discussed herein, change profile 120 and candidate profile 254 will be described as including a change in file size (e.g., measured in megabytes) for purposes of description. However, it is understood that representative profile 124 and candidate profile 254 can represent other attributes affected by event 106 (FIG. 1), and other examples are discussed herein where appropriate.

In step S1, system sorter 238 of knowledge base creation program 206 can select an example group of one or more change profiles sharing the same identifying tag 122. This selected group can be obtained, e.g., from plurality of systems 250 or another group of related or unrelated systems. This selection can be automatic based on predetermined criteria defined knowledge base creation program 206 (e.g., types of file names or increases in file size, sharing a particular event 106 (FIG. 1), etc.), can be dictated via user selection, and/or can be selected via discovery rules generated by a system and/or programmed by a user, e.g., by a file name search or query for active processes with particular names. In any case, the group of systems selected in step S1 can correspond to a single tag 122, and can be used for discovering whether other systems are similar.

The flow can proceed to step S2, where profile extractor 236 can create representative profile 124 for the group of systems with the same tag 122 selected in step S1. As discussed elsewhere herein with respect to FIG. 1, representative profile 124 created in step S2 can include fewer than all possible changes and/or affected attributes stemming from event 106 (FIG. 1). To create representative profile 124, profile extractor 236 of profile processing system 218 can extract predetermined attributes (e.g., changes to file size) from one or more change profiles 120. In an example embodiment, representative profile 124 can be a list of files and their changes in size following event 106. During the creation of representative profile 124, particular attributes in particular change profiles 120 can be assigned a weight value (i.e., a relative mathematical importance). Calculator 232 according to predetermined rules can emphasize or deemphasize particular attributes from certain change profiles 120 when constructing representative profile 124. Thus, representative profile 124 can be extracted according to algorithms, programming instructions, look-up tables, formulas and/or algorithms for assigning weights for particular attributes and/or other computer implementations for creating representative profiles 124 for a particular event 106 (FIG. 1).

In step S3, profile extractor 236 of knowledge base creation program 206 can select candidate system 252 from plurality of systems 250. Candidate system 252 can be selected at random, via a command from a user, and/or predetermined criteria for selecting one or more systems from plurality of systems 250, (e.g., systems having files below a maximum or minimum change in size between two reference points in time). Knowledge base creation program 206 can optionally select candidate system 252 in step S3 based on particular instructions or attributes, e.g., systems with files which changed in size between two reference points in time. Alternatively, candidate system 252 can be selected based on the results of a random number generator, such as by randomly generating a serial number and selecting candidate system 252 with the generated serial number.

In step S4, profile extractor 236 can create candidate profile 254 for candidate system 252, which may be stored, e.g., in memory 212 of computing device 202. As discussed elsewhere herein, representative profile 124 and candidate profile 254 can be in the same format and/or may include the same group of attributes. Specifically, candidate profile 254 can include changes in file size for a group of files from candidate system 252. It is also understood that profile extractor 236 can create several candidate profiles 254 for several candidate systems 252 in step S3. In this case, embodiments of the processes discussed herein can be performed for each of the candidate profiles 254, in sequence or simultaneously.

At step S5, calculator 232 can calculate difference 270 (FIG. 3) between at least one candidate profile 254 and representative profile 124. For example, difference 270 can be expressed as a difference between the change in file sizes listed in representative profile 124 and candidate profile 254. More specifically, difference 270 can indicate whether change profile 254 increased or decreased in size (e.g., megabytes) to a larger degree from event 106 (FIG. 1) than representative profile 124. In any case, difference 270 can be expressed as a particular data item with at least some of the same attributes included in representative profile 124 and candidate profile 254. Calculator 232 can calculate difference 270 via predetermined formulas, mathematical techniques, algorithms, process steps, and/or combinations thereof.

At step S6, determinator 234 can determine whether difference 270 (FIG. 3) between candidate system 252 and representative profile 124 is "within" threshold 272 (FIG. 3). As used herein, difference 270 being "within" threshold 272 in one sense can include having a value or group of values being bounded by a range of values or group of values which denote similarity between representative profile 124 and candidate profile 254. For example, threshold 272 can denote a maximum difference between the increase in file size for candidate profile 254 and representative profile 124 for candidate profile 254 to be within threshold 272. In another sense, difference 270 being "within" threshold 272 can include the attributes included in difference 270 meeting conditions set out in threshold 272, e.g., the attributes of difference 270 meeting certain requirements of threshold 272 or including particular features. For example, threshold 272 can indicate that, for representative profile 124 and candidate system 254 to be similar, a particular file or group of files must have been added to both profiles. As part of step S6 or an independent process performed by another software and/or hardware component, comparator 230 can compare difference 270 to threshold 272, e.g., by way of mathematical comparisons. Where determinator 234 determines, based on this comparison, that difference 270 is within threshold 272 (i.e., "no" at step S6), the flow proceeds to step S7. At step S7, system sorter 238 can flag candidate system 252 as being dissimilar. Where determinator 234 determines that difference 270 is within threshold 272 (i.e., "yes" at step S6), system sorter 238 can flag candidate system 252 as being similar to the systems represented by representative profile 124 in repository 220. System sorter 238 can then associate tag 122 with candidate profile 254, and add candidate profile 254 to repository 220 at step S9 as a new change profile 120 associated with tag 122.

At step S10, following either step S9 or step S7, determinator 234 can determine whether any systems in plurality of systems 250 have not been flagged as either similar or dissimilar. Where at least one system in plurality of systems 250 is not a flagged system 256 (i.e., "yes" at step S10), the flow can return to step S3 where another candidate system 252 is selected. Where all systems in plurality of systems 250 are flagged systems 256 (i.e., "no" at step S10), the flow can end ("Done"). Optionally, methods according to the present disclosure can include executing another iteration of the flow shown in FIG. 3 for a different plurality of systems 250 and/or a different group of processes.

Alternative Process Methodologies

Regardless of the form in which representative profile 124 and candidate profile 254 are created, the process flow shown in FIG. 4 and described herein can be modified to apply additional or alternative thresholds 272 (FIG. 3) when determining in step S6 whether candidate profile 254 (FIG. 2) is similar to representative profile 124, i.e., by comparing difference 270 (FIG. 3) with threshold 272.

In another embodiment, methodologies according to the present disclosure can be applied in succession to further refine the created knowledge base. In some embodiments, several thresholds 272 can be divided into multiple, increasingly detailed groups. One or more group thresholds can be associated with each other and referred to as a "threshold level." Where desired, an additional determination at step S11 (shown in phantom) can occur where determinator 234 determines in step S10 that no unflagged systems remain (i.e., "no" in step S10). At step S11, determinator 234 can determine whether additional threshold levels remain, i.e., have not been applied candidate profiles 254 from plurality of systems 250. The use of multiple threshold levels in embodiments of the present disclosure can serve to quickly flag a large number of candidate systems 252 before repeating process steps S3-10 with thresholds 272 of the next threshold level, which can include more detailed criteria. Where all threshold levels have been applied previously (i.e., "no" at step S11), the process can conclude ("Done").

Where at least one threshold level has not been applied previously (i.e., "yes" at step S11), the flow can proceed to step S12 where system sorter 238 can unflag all systems in plurality of systems 250 that had been flagged as similar in step S8. The unflagging in step S12 can prevent systems previously flagged as dissimilar in step S7 from being a candidate system again in step S3. At step S13, system sorter 238 can select a new threshold level with thresholds 272 to be compared with difference(s) 270 in step S6. The new threshold level selected in step S13 can include, e.g., a more detailed and/or selective thresholds than were present one or more of the previous threshold levels. Thus, thresholds 272 which require more space in memory and/or processing time can be reserved for later threshold levels. After a new threshold level is selected in step S13, a new representative profile 124 can be created in step S2 from the group of change profiles 120 in repository 220, optionally including any new change profiles 120 added in other process steps or previous executions.

Figure 5:
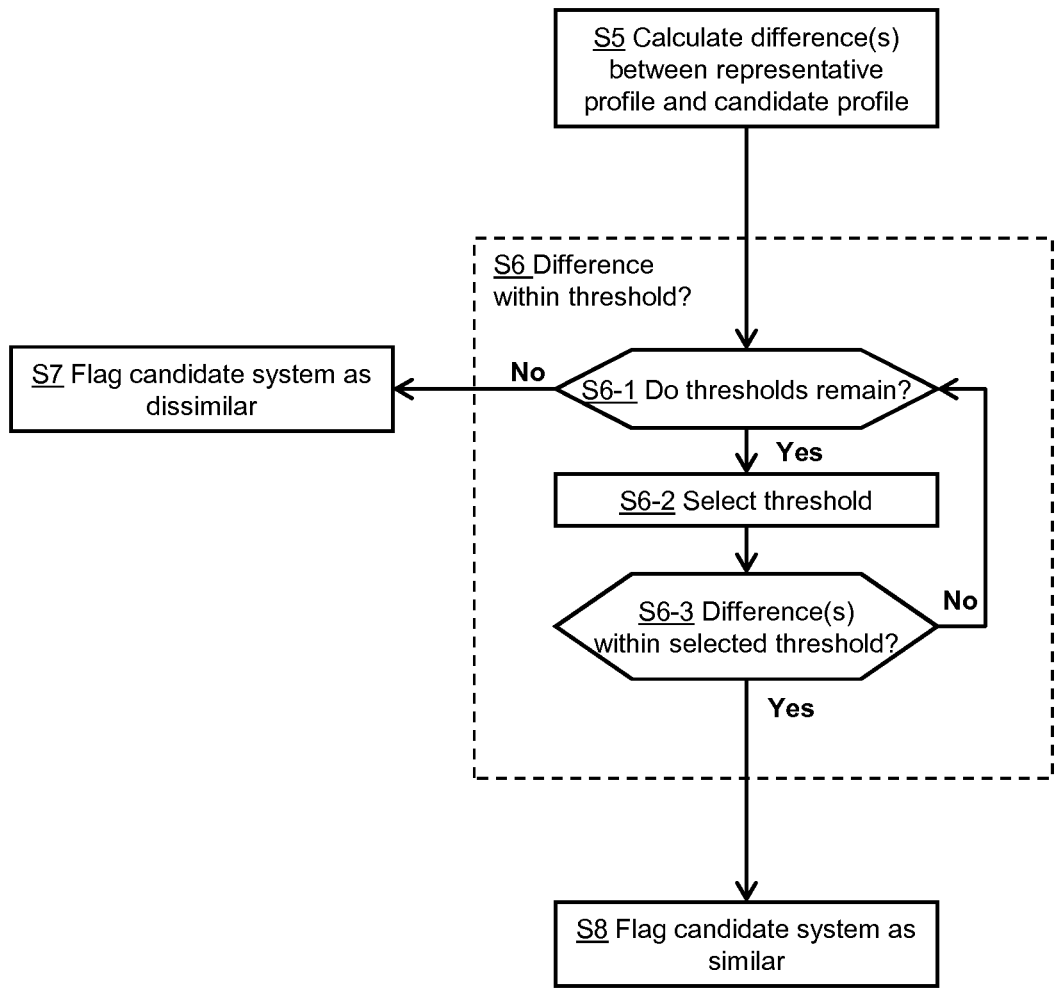
FIG. 5 depicts a flow diagram with illustrative method steps according to embodiments of the present disclosure.

In another embodiment, referring to FIGS. 2 and 5 together, step S5 can be modified to include calculating multiple differences between representative profile 124 and candidate profile 254 in step S5. The multiple differences can be a result of multiple candidate profiles 254 being used, and/or representative profile 124 and candidate profile 254 including several types of attributes. For example, in step S5, one difference 270 can represent a total increase in file size for one candidate profile 254 and representative profile 124, while another difference 270 can represent a decrease in the size of one file in candidate profile 254 and a representative profile 124. In a modified process, determinator 234 in sub-step S6-1 can determine whether one or more thresholds "remain." In this context, a threshold which "remains" can include any threshold 272 which has not previously been compared to difference(s) 270 (FIG. 3) in step S6. Where no thresholds remain, (i.e., "no" at sub-step S6-1), system sorter 238 can flag candidate system 252 as being dissimilar.

Where at least one threshold has not been applied to difference(s) 270 (FIG. 3) calculated in step S5 (i.e., "yes" at sub-step S6-1), the flow can proceed to sub-step S6-2 for selecting new threshold(s) 272. System sorter 238 can select new thresholds 272 from a predetermined list of thresholds to be applied to each difference 270 between representative profile 124 and candidate profile 254. Following sub-step S6-2, the flow can proceed to sub-step S6-3, where at least one difference 270 (FIG. 3) is compared to the selected threshold(s) 272. Where difference(s) 270 are within the selected thresholds 272 (i.e., "yes" at sub-step S6-3), the flow can proceed to step S8 for flagging candidate system 252 as similar. Where less no differences 270 are within threshold(s) 272 (i.e., "no" at sub-step S6-3), the flow can return to sub-step S6-11 for determining whether one or more thresholds remain. The process flow shown in FIG. 5 and discussed herein may be applicable where changes to candidate system 252 from one event 106 (FIG. 1) can manifest in a variety of ways or cause random changes.

Introduction to Examples of Representative Profiles

To further illustrate embodiments of the present disclosure, different types of representative profiles 124 created in step S2 and/or candidate profiles 254 created in step S4 are discussed. Attributes within representative profile 124 and/or candidate profile 254 can significantly affect whether candidate systems 252 are flagged as similar and their corresponding candidate profiles 254 are added to repository 220. As is discussed herein by reference to FIGS. 2 and 4, the attributes within representative profile 124 and/or candidate profile 254 can include changes in file size. Including the difference in file size (e.g., measured in megabytes) between first profile 110 (FIG. 1) and second profile 112 (FIG. 1) in the change profiles 120 for representative profile 124, and candidate profile 254, may be simple and conducive to quickly building a knowledge base. However, this approach may not be helpful for events 106 (FIG. 1) which cause variances by external or unpredictable factors, e.g., some front-end user operations, back-end processing events, etc. Representative profiles 124 and candidate profiles 254 which include only a difference in file size may cause embodiments of the disclosure to incorrectly flag some candidate systems 252 as being dissimilar, when in truth these systems are actually similar to the systems represented by representative profile 124 of repository 220. Including different types of attributes in change profiles 120 and candidate profile 254 can reduce this problem from occurring, or in some cases eliminate the problem.

First Example: File Base-Name Index

A first example type of representative profile 124 created in step S2 and candidate profile 254 created in step S4 can include a file base-name index. Representative profiles 120 and candidate profiles 254 in the form of a file base-name index can include a list of base-names for all added and modified file features shared between initial state 102 (FIG. 1) and updated state 104 (FIG. 1) of the corresponding system 100 (FIG. 1). Using only the base-names of the files in first and second profiles 110, 112 (FIG. 1) can account for a variety of file changes, regardless of which directory the corresponding files are stored in initial and updated states 102, 104. The file base-name index form of representative profile 124 and candidate profile 254 generally provides an illustrative representation of different system changes. In addition, the file base-name index is generally compact and distortion resistant, which makes this type of representative profile 124 and candidate profile 254 especially suitable early filtering of dissimilar systems (i.e., systems not affected by the same event represented with representative profile 124) from large pluralities of systems 250.

Where file base-name index form is used, calculator 232 can calculate difference 270 (FIG. 1) at step S5 between representative profile 124 and candidate profile 254 at step S5 according to the example process steps discussed. First, the "length" of each file base-name index can be defined as the number of the base-names in change profile 120 and candidate profile 254. For representative profile 124 and any candidate profile 254, calculator 232 can compute similarity scores for the two profiles. The similarity score can be defined mathematically as, e.g., as a ratio of the number of common base-names in the profile divided by the length value of the same profile. The value of the similarity scores for representative profile 124 and candidate profile 254 can denote one of four different relationships between the two profiles.

Determinator 234 can use these similarity scores at step S6 to determine whether difference 270 (FIG. 1) is within threshold 272 (FIG. 1). In this case, threshold 272 may take the form of possible relationships between the two scores. Where the two similarity scores are approximately equal to one (e.g., within a predetermined margin of error), then representative profile 124 and candidate profile 254 and are similar to each other. Where the similarity score for representative profile 124 or candidate profile 254 is approximately equal to one and significantly greater than the other similarity score (i.e., greater than a predetermined threshold), then the profile with the larger similarity score is both similar to and at least partially contained within the other profile. Where the similarity score for both representative profile 124 and candidate profile 254 is not close to one (i.e., outside a predetermined margin of error), the two profiles are dissimilar.

As an addition or alternative to similarity scores, difference 270 (FIG. 3) calculated in step S5 can be calculated from the number of matching or different characters in the file base-name representations for representative profile 124 and candidate profile 254 ("character differential"), or groups of specific letters shared or different between representative profile 124 and candidate profile 254. In addition, threshold 272 (FIG. 3) applied in step S6 can be defined by the same quantities as difference 270. In this way, determinator 234 can determine whether difference 270 is within threshold 272.

First and second profiles 110, 112 (FIG. 1) may include thousands of file features. In these situations, the file base-name index form, which consists of base-names of all the file features, may not be sufficiently compact for use with large pluralities of systems 250. In addition, several first and second profiles 110, 112 may share several common base-names which did not change in significant parts of the system (e.g., updates to an installation repository, creation of temporary files, etc.), and may prevent the file base-name indices for representative profile 124 and candidate profile 254 from being distinguishable. Furthermore, there may be a larger opportunity for profile processing system 218 to apply learning algorithms where representative profile 124 and candidate profile 254 are expressed as a particular quantity or group of quantities. In these scenarios, representative profile 124 and candidate profile 254 can be expressed as histograms.

Second Example: Histogram Representation

As a second example, profile extractor 236 can create representative profile 124 and candidate profile 254 in histogram form using a hashing function, or other set of mathematical operations and/or programming steps, to convert the strings of base-names into integers. For each file base-name in representative profile 124 and candidate profile 254, calculator 232 can calculate a sum (e.g., an ASCII sum) of its characters. In this example implementation, profile processing system 218 inputs the ASCII sum into a hash function to convert the various strings into integers. Other types of sums can be interchanged with the ASCII sum where desired and/or necessary. Next, using the converted integers, profile extractor 236 can generate a histogram from these integers.

The generated histogram can be divided into segments known as "bins" for grouping integers of a similar value together. The chosen total number of bins ($N_{bins}$) can determine the numerical range of each bin of the histogram. In an example, the ASCII sum integers can range in value between two-hundred and two-thousand. In this case, the bin range is designated as (0, 200, 200+(2000-200)/($N_{bins}$-1), 200+2*(2000-200)/($N_{bins}$-1), 2000-(2000-200)/($N_{bins}$-10, 2000), ∞). The number of ASCII sum integers which correspond to each bin can then be calculated. After each integer is assigned to a corresponding bin, the histogram can be normalized by converting the number of integers in each bin into a fraction of the total number of integers, e.g., as a ratio to the number one, or as a percentage. Normalization processes, such as those shown by example herein, can prevent embodiments of the present disclosure from being affected by the length values of candidate profile 254 and representative profile 124 (i.e., as file base-name indices).

Advantages representing representative profile 124 and candidate profile 254 in histogram form include the ability to apply external learning algorithms and metrics designed for use with histograms. These algorithms, metrics, etc., can be applied in step S6 to determine whether representative profile 124 and candidate profile 254 are within threshold 272. In one example, difference 270 (FIG. 3) between representative profile 124 and candidate profile 254 in histogram form can be represented with a distance metric. Lower values of distance (e.g., below a particular distance metric of threshold 272 (FIG. 2) can correspond to two representative profiles 124 being similar to each other. One type of distance metric is Euclidean distance. For two normalized histograms, the Euclidean distance can be expressed as the absolute value of the difference between the histogram lengths of representative profile 124 and candidate profile 254. For further comparison, the Euclidean distance can be expressed as a fraction of percentage of a maximum difference between two normalized histograms.

Third Example: Pixel-Level Image Representation

Figure 6:
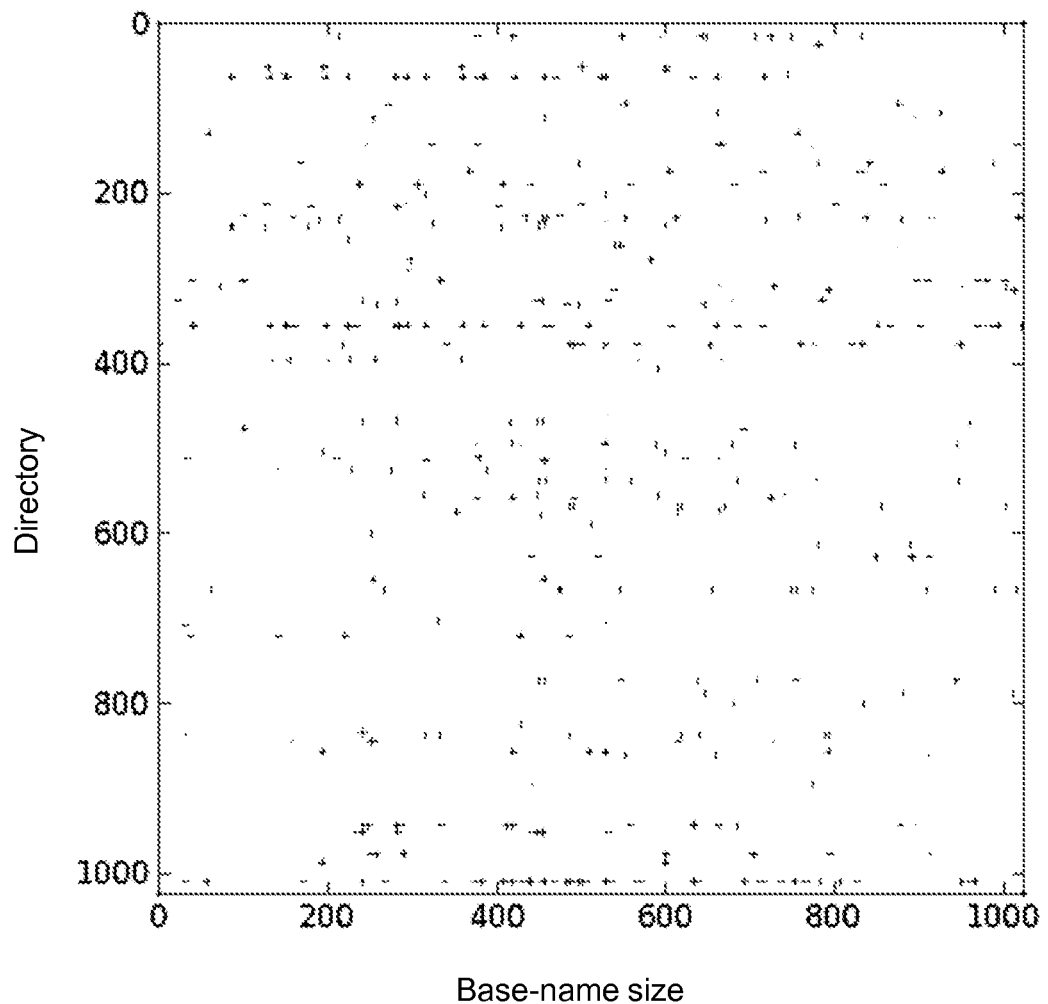
FIG. 6 depicts an example pixel-level image representation of a representative profile or candidate profile according to embodiments of the present disclosure.

As a third example, other embodiments of the present disclosure can create representative profile 124 and candidate profiles 254 in the form of pixel-level images. Turning briefly to FIG. 6, an example of representative profile 124 or candidate profile 254 as a pixel-level image is shown. The pixel-level image can be modeled as, e.g., a graph plotted relative to two axes. One axis (X-axis in FIG. 6) can denote file base-names within a particular system, and another axis (Y-axis in FIG. 6) can denote file directories within the same system (represented as identifying numbers). The graph can include several data points with, e.g., colors corresponding to the types of attributes being tracked. The various colors in a pixel-level image are represented in FIG. 6 as different shapes (i.e., +, −, and |). Data points of one color can correspond to files in a particular directory where a mode, user identification, etc. has been changed. Data points of another color can correspond to files in a particular directory which have changed in size (e.g., increased or decreased). Additional colors can be added as desired to designate other attributes. Returning to FIGS. 2 and 4, calculator 232 can calculate difference 270 (FIG. 3) between representative profile 124 and candidate profile 254 in step S5 by computing the differences between the coordinates of data points of the same color in the respective pixel-level image representations.

Differences between pixel-level image representations can be calculated in several ways. For example, difference 270 (FIG. 3) calculated in step S5 can be expressed as a pixel differential. Calculator 232 can calculate difference 270 by identifying a row or column in each pixel-level image (e.g., using a value or range of values for each axis) and calculating a number of pixels of the same color are found in both representative profile 124 and candidate profile 254, and/or identifying the row or column with the largest number of matching pixels. Other approaches can include calculating (e.g., via calculator 232) a total number of shared pixels between representative profile 124 and candidate profile 254 for each row or column. In another embodiment, the total number of pixels shared between representative profile 124 and candidate profile 254 can be calculated. The pixel-level image representation can be suitable, e.g., for situations where the same program has been installed in a particular system at two different directories. In embodiments where representative profile 124 and candidate profile 254 take the form of pixel-level images, system sorter 238 can define corresponding thresholds 272 (FIG. 3) in step S6. For example system sorter 238 can define threshold 272 as a maximum pixel differential, a particular number of pixels shared or different between the entire pixel-level image presentation or portion thereof, etc. In addition or alternatively, difference 270 (FIG. 3) calculated in step S5 can be normalized and expressed as a percentage of total pixels which remain unchanged between representative profile 124 and candidate profile 254. Some advantages from representative profile 124 and candidate profile 254 being represented as pixel-level images can include providing a visual indication of how a system has changed/can change, resistance to distortion from similar changes affecting different directories and/or file names, a high level of detail which illustrates changes to paths for a file, and/or the ability to calculate difference 270 and define 272 in terms of pixel similarity.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of creating a knowledge base of similar systems from a plurality of systems, the method comprising using a computing device to perform actions including:
creating a representative profile from a plurality of change profiles stored in a repository of change profiles, each of the plurality of change profiles being associated with an identical identifying tag, the identifying tag indicating that each of the plurality of change profiles is associated with an identical event, wherein the representative profile includes a set of differences in attributes of a representative system between a first time preceding the event and a second time following the event, wherein the attributes include a system configuration, a system connection, a disk size, a file size, file names, a listing of open files, a software package, one or more listings of hardware components and a process embodied within the plurality of systems, wherein the attributes are assigned a weight value to represent a relative mathematical importance and to emphasize particular attributes from the plurality of change profiles based on predefined algorithms, programming instructions, look-up tables, or formulas that calculate length of the number of file base-names in the change profiles, an ASCII sum of characters in the file base-names in the change profiles or a difference between coordinates of data points of the same color in pixel-level image representations of the change profiles;
creating a candidate profile for a first candidate system from the plurality of systems, the first candidate system not being flagged as similar or dissimilar to any change profile from the repository of change profiles, wherein the candidate profile includes a set of differences in attributes of the first candidate system between the first time preceding the event and the second time following the event, and wherein the set of differences includes fewer than all changes to the attributes of the first candidate system from the event;

after creating the representative profile and the candidate profile, calculating at least one difference between the set of differences in attributes of the representative profile and the set of differences in attributes of the candidate profile;

in response to the at least one difference not being within at least one threshold, flagging the first candidate system as being dissimilar to the representative profile; and in response to each of the at least one difference being within the at least one threshold, flagging the first candidate system as being similar to the representative profile, associating the identifying tag with the candidate profile, and adding the candidate profile to the repository as a new change profile.

2. The method of claim 1, wherein the representative profile and the candidate profile each include a histogram representation of changes from the event.

3. The method of claim 2, wherein the difference includes a Euclidian distance between the histogram of the representative profile and the histogram of the candidate profile.

4. The method of claim 1, wherein the representative profile and the candidate profile each include a file base-name representation of changes from the event.

5. The method of claim 4, wherein the difference represents a character differential between the file base-names of the representative profile and the candidate profile.

6. The method of claim 1, wherein the representative profile and the candidate profile each include an image representation of changes from the event.

7. The method of claim 6, wherein the difference represents a pixel differential between the representative profile and the candidate profile.

8. The method of claim 1, further comprising:
creating an additional candidate profile for a second candidate system from the plurality of systems, the second candidate system not being flagged as similar or dissimilar, wherein the additional candidate profile includes fewer than all changes to the second candidate system from the event;

calculating at least one second difference between the representative profile and the additional candidate profile;

in response to the at least one second difference exceeding at least one additional threshold, flagging the second candidate system as being dissimilar, wherein the at least one additional threshold is different from the at least one threshold; and in response to each of the at least one second difference not exceeding the at least one additional threshold, flagging the second candidate system as being similar, associating the identifying tag with the additional candidate profile, and adding the additional candidate profile to the repository as a new change profile.

9. The method of claim 1, wherein the event comprises one of a software update, a software installation, a system configuration change, and a system change from a running process.

10. A program product stored on a computer readable storage medium, the program product operative to create a knowledge base of similar systems from a plurality of systems when executed, the computer readable storage medium comprising program code for:
creating a representative profile from a plurality of change profiles stored in a repository of change profiles, each of the plurality of change profiles being associated with an identical identifying tag, the identifying tag indicating that each of the plurality of change profiles is associated with an identical event, wherein the representative profile includes a set of differences in attributes of a representative system between a first time preceding the event and a second time following the event, wherein the attributes include a system configuration, a system connection, a disk size, a file size, file names, a listing of open files, a software package, one or more listings of hardware components and a process embodied within the plurality of systems, wherein the attributes are assigned a weight value to represent a relative mathematical importance and to emphasize particular attributes from the plurality of change profiles based on predefined algorithms, programming instructions, look-up tables, or formulas that calculate length of the number of file base-names in the change profiles, an ASCII sum of characters in the file base-names in the change profiles or a difference between coordinates of data points of the same color in pixel-level image representations of the change profiles;

creating a candidate profile for a first candidate system from the plurality of systems, the first candidate system not being flagged as similar or dissimilar to any change profile from the repository of change profiles, wherein the candidate profile includes a set of differences in attributes of the first candidate system between the first time preceding the event and the second time following the event, and wherein the set of differences includes fewer than all changes to the attributes of the first candidate system from the event;

after creating the representative profile and the candidate profile, calculating at least one difference between the set of differences in attributes of the representative profile and the set of differences in attributes of the candidate profile;

in response to the at least one difference not being within at least one threshold, flagging the first candidate system as being dissimilar to the representative profile; and in response to each of the at least one difference being within the at least one threshold, flagging the first candidate system as being similar to the representative profile, associating the identifying tag with the candidate profile, and adding the candidate profile to the repository as a new change profile, and wherein the adding the candidate profile to the repository builds a knowledge base of changing system attributes by adaptive learning.

11. The program product of claim 10, wherein the representative profile and the candidate profile each include a histogram representation of changes from the event.

12. The program product of claim 11, wherein the difference includes a Euclidian distance between the histogram of the representative profile and the histogram of the candidate profile.

13. The program product of claim 10, wherein the representative profile and the candidate profile each include a file base-name representation of changes from the event.

14. The program product of claim 13, wherein the difference represents a character differential between the file base-names of the representative profile and the candidate profile.

15. The program product of claim 10, wherein the representative profile and the candidate profile each include an image representation of changes from the event.

16. The program product of claim 15, wherein the difference represents a pixel differential between the representative profile and the candidate profile.

17. The program product of claim 10, further comprising program code for:
    creating an additional candidate profile for a second candidate system from the plurality of systems, the second candidate system not being flagged as similar or dissimilar, wherein the additional candidate profile includes fewer than all changes to the second candidate system from the event;
    calculating at least one second difference between the representative profile and the additional candidate profile;
    in response to the at least one second difference exceeding at least one additional threshold, flagging the second candidate system as being dissimilar, wherein the at least one additional threshold is different from the at least one threshold; and
    in response to each of the at least one second difference not exceeding the at least one additional threshold, flagging the second candidate system as being similar, associating the identifying tag with the additional candidate profile, and adding the additional candidate profile to the repository as a new change profile.

18. The program product of claim 10, wherein the event comprises one of a software update, a software installation, a system configuration change, and a system change from a running process.

19. A system for creating a knowledge base of similar systems from a plurality of systems, the system comprising:
    a profile extractor for creating a representative profile from a plurality of change profiles stored in a repository of change profiles, each of the plurality of change profiles being associated with an identical identifying tag, the identifying tag indicating that each of the plurality of change profiles is associated with an identical event, wherein the representative profile includes a set of differences in attributes of a representative system between a first time preceding the event and a second time following the event, wherein the attributes include a system configuration, a system connection, a disk size, a file size, file names, a listing of open files, a software package, one or more listings of hardware components and a process embodied within the plurality of systems, wherein the attributes are assigned a weight value to represent a relative mathematical importance and to emphasize particular attributes from the plurality of change profiles based on predefined algorithms, programming instructions, look-up tables, or formulas that calculate length of the number of file base-names in the change profiles, an ASCII sum of characters in the file base-names in the change profiles or a difference between coordinates of data points of the same color in pixel-level image representations of the change profiles;
    after creating the representative profile and the candidate profile, calculating at least one difference between the set of differences in attributes of the representative profile and the set of differences in attributes of the candidate profile; and
    a system sorter for:
        in response to the at least one difference not being within at least one threshold, flagging the first candidate system as being dissimilar to the representative profile; and
        in response to each of the at least one difference being within the at least one threshold, flagging the first candidate system as being similar to the representative profile, associating the identifying tag with the candidate profile, and adding the candidate profile to the repository as a new change profile.

20. The system of claim 19, wherein the event comprises one of a software update and a software installation.

* * * * *